(12) United States Patent
Perez et al.

(10) Patent No.: US 10,958,730 B2
(45) Date of Patent: Mar. 23, 2021

(54) MAPPING VIRTUAL NETWORK FUNCTIONS

(71) Applicant: Hewlett Packard Enterprise Development LP, Houston, TX (US)

(72) Inventors: Ignacio Aldama Perez, Alcobendas (ES); Kumaresan Ellappan, Bangalore (IN); Ruben Sevilla Giron, Alcorcon (ES); Javier Garcia Lopez, Las Rozas (ES)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/145,434

(22) Filed: Sep. 28, 2018

(65) Prior Publication Data
US 2020/0106834 A1 Apr. 2, 2020

(51) Int. Cl.
*H04L 29/08* (2006.01)
*G06F 9/455* (2018.01)
*G06F 9/50* (2006.01)

(52) U.S. Cl.
CPC ...... *H04L 67/1097* (2013.01); *G06F 9/45558* (2013.01); *G06F 9/5077* (2013.01); *G06F 2009/45595* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 9,792,150 | B1* | 10/2017 | Rangari | G06F 9/4856 |
| 9,838,272 | B2 | 12/2017 | Djukic et al. | |
| 2013/0179895 | A1* | 7/2013 | Calder | G06F 9/5077 718/104 |
| 2013/0262801 | A1* | 10/2013 | Sancheti | G06F 3/0619 711/162 |
| 2016/0335111 | A1* | 11/2016 | Bruun | G06F 9/45558 |
| 2017/0230242 | A1* | 8/2017 | Hammer | H04L 41/0806 |
| 2017/0371717 | A1* | 12/2017 | Kiess | G06F 9/45558 |

(Continued)

FOREIGN PATENT DOCUMENTS

| | | |
|---|---|---|
| CN | 106533818 | 3/2017 |
| WO | WO-2016123794 | 8/2016 |

(Continued)

OTHER PUBLICATIONS

Gao, M. et al.; "Optimal Orchestration of Virtual Network Functions"; Jun. 15, 2017; 15 pages.

(Continued)

*Primary Examiner* — Hermon Asres
(74) *Attorney, Agent, or Firm* — Brooks, Cameron & Huebsch, PLLC (57) ABSTRACT

An example system including a controller, a processing resource, and a memory resource including instructions that when executed cause the processing resource to discover an orphan virtual machine (VM) included in a cloud platform. The controller may determine characteristics of the orphan VM based on information identified in the cloud platform and map the orphan VM to a virtual network function (VNF) based on the information identified in the cloud platform and assign the VNF to a tenant based on the characteristics of the orphan VM.

24 Claims, 5 Drawing Sheets

(56) References Cited

U.S. PATENT DOCUMENTS

2018/0069749 A1    3/2018   Singhal et al.
2018/0152347 A1*   5/2018   Dhandu .............. H04L 41/0816

FOREIGN PATENT DOCUMENTS

WO    WO-2017078790    5/2017
WO    WO-2017139705    8/2017

OTHER PUBLICATIONS

Landry, K.; "Manage VNF Deployment for IP Routing and EPC"; Mar. 8, 2016; 7 pages.
Pinto, L. P. S.; "Creation of a Marketplace for NFV Functions"; Jul. 25, 2017; 199 pages.

* cited by examiner

MAPPING VIRTUAL NETWORK FUNCTIONS

BACKGROUND

Virtual Machine (VM) is an emulation of a computing system. The VM is hosted on a computing system, such as a server, and utilized resources, such as central processing unit (CPU), random access memory (RAM), and storage, of the computing system for its operations. The VM can be transferred or migrated from the computing system on which it is hosted to another computing system.

DETAILED DESCRIPTION

Telecommunication providers may be increasingly adopting the utilization of Network Functions Virtualization (NFV) within their network infrastructure. As used herein, the term "network function virtualization" (NVF) can, for example, refer to a network architecture that utilizes Virtual Network Function (VNF) to virtualize network node functions that may connect to create communication services. As used herein, the term "Virtual Network Function" (VNF) can, for example, refer to the virtual implementation of a network function. A VNF may include an individual VM or multiple VMs that may work as a single entity. Telecommunication providers adopting NFV on a cloud platform develop VNFs to exist on the cloud platform.

As used herein, the term "cloud platform" can, for example, be referred to broadly as a network that delivers requested virtual resources as a service. In one example, a cloud network may provide a computing environment where users can have access to applications or computing resources, as services, from anywhere through their connected devices. These services may be provided by entities called cloud services providers. Examples of services that may be provided via a cloud network include infrastructure as a service (IaaS), platform as a service (PaaS), and software as a service (SaaS). A Virtual Infrastructure Manager (VIM) may control the interaction of the VNF(s) and the compute, networking, VM inventory, and storage resources of the cloud platform. The cloud platform may include a controller to orchestrate and manage the infrastructure resources of the VIM and control the network services of the cloud platform.

In some cloud platforms, the VMs of the VNFs operating on the cloud platform may be created as the NFV is adopted. For example, the VIM may be aware of the existence of the VNFs, the corresponding VM(s) and the operations may be managed by the VIM and the controller when the VNF is adopted. However, an orphan VM, and/or multiple orphan VMs, may have been manually developed for the implementation of VNFs prior to the NFV adoption by the cloud platform. The controller may not have visibility of the VMs and VNFs operating on the cloud platform, and as such, may be unaware of the resources available and/or the resources currently in use. As used herein, the term "orphan VM" can, for example, refer to a VM that was manually created, installed, configured, and/or controlled. In some examples, an orphan VM may be manually created prior to the adoption of the NFV and may not be visible on the cloud platform. As used herein, the term "visible" and/or "visibility" can for example, refer to a determination, identification, and/or recognition of devices, and/or device operation within a computing architecture. In other examples, the orphan VM may be manually created after the adoption of the NFV as demanded (e.g., incidences of urgency or during a service outage).

For example, a cloud platform may include a VNF (or multiple VNFs) operating prior to the NFV implementation. These VNFs that were created prior to the implementation of the NFV on the cloud platform and may include multiple orphan VMs. The orphan VMs may not be managed by the NFV controller as they may not be visible to the controller. As such, the orphan VMs may be dependent on manual operation. In some examples, multiple (e.g., hundreds) of VMs may be created manually. As such, the manual control and operation of such orphan VMs may become unmanageable and computing resources, time, and money may be lost to the mismanagement of orphan VMs. The lack of visibility of the orphan VMs and the corresponding resources used on the cloud platform may cause the cloud platform to operate inefficiently, waste computation resources, waste money, and/or impede scale in/scale out, and/or healing operations.

Some solutions to the management of an orphan VM(s) include manually matching (e.g., mapping) the orphan VM to a corresponding VNF based on the knowledge of each orphan VM by the creator of the orphan VM. Said differently, manually matching the orphan VM may demand the expertise of the entity (e.g., a user) that manually created the orphan VM. Such manual matching solutions are tedious, error prone, time-consuming, and may demand the attention of the user/operator who manually created the orphan VM. This solution may not be practical and may be inefficient to the orchestration of NFV on a cloud platform. Further, an orphan VM (or multiple orphan VMs) may be missed in the process of manually matching the orphan VM(s) to corresponding VNF(s) on the cloud platform. As a result, computing resources may be used by the missed orphan VM, and the controller may deploy additional VNF(s) without identifying the computing resources occupied by the missed orphan VM. Because the manual correlation of the orphan VMs to the corresponding VNF(s) may be tedious, error prone, and time consuming examples herein disclose the discovery of orphan VM(s) for mapping an orphan VM (or multiple orphan VMs) to a VNF (or multiple VNFs).

Examples herein disclose mapping VNFs by discovering orphan VM(s) on the cloud platform. For example, the controller may utilize information available on the cloud platform about an orphan VM to discover the orphan VM on the cloud platform and map the orphan VM to an individual VNF in a one-to-one manner. As used herein, the term "one-to-one" can, for example, refer to a controller mapping an orphan VM to an individual VNF as the orphan VM is discovered. In this way, the controller may gain visibility of the orphan VM(s) on the cloud platform and the orphan VM(s) may be controlled, altered, deleted, or otherwise manipulated. In another example, the controller may organize multiple orphan VMs into an individual VNF based on information available to the controller from the cloud platform. This may provide identification of a VNF such that policies of the controller may be applied, and scale in/scale out operations may be applied to the cloud platform. In another example, the controller may discover the orphan VMs and check for an identification mark (e.g., metadata, and/or a universally unique identifier) whereby the controller may automatically organize multiple orphan VMs into a single VNF. In this way, a controller may detect an orphan VM without an identification mark and generate an alert to a tenant of the VNF. Further, this may allow the controller to determine when a new orphan VM is present on the cloud platform.

Figure 1:
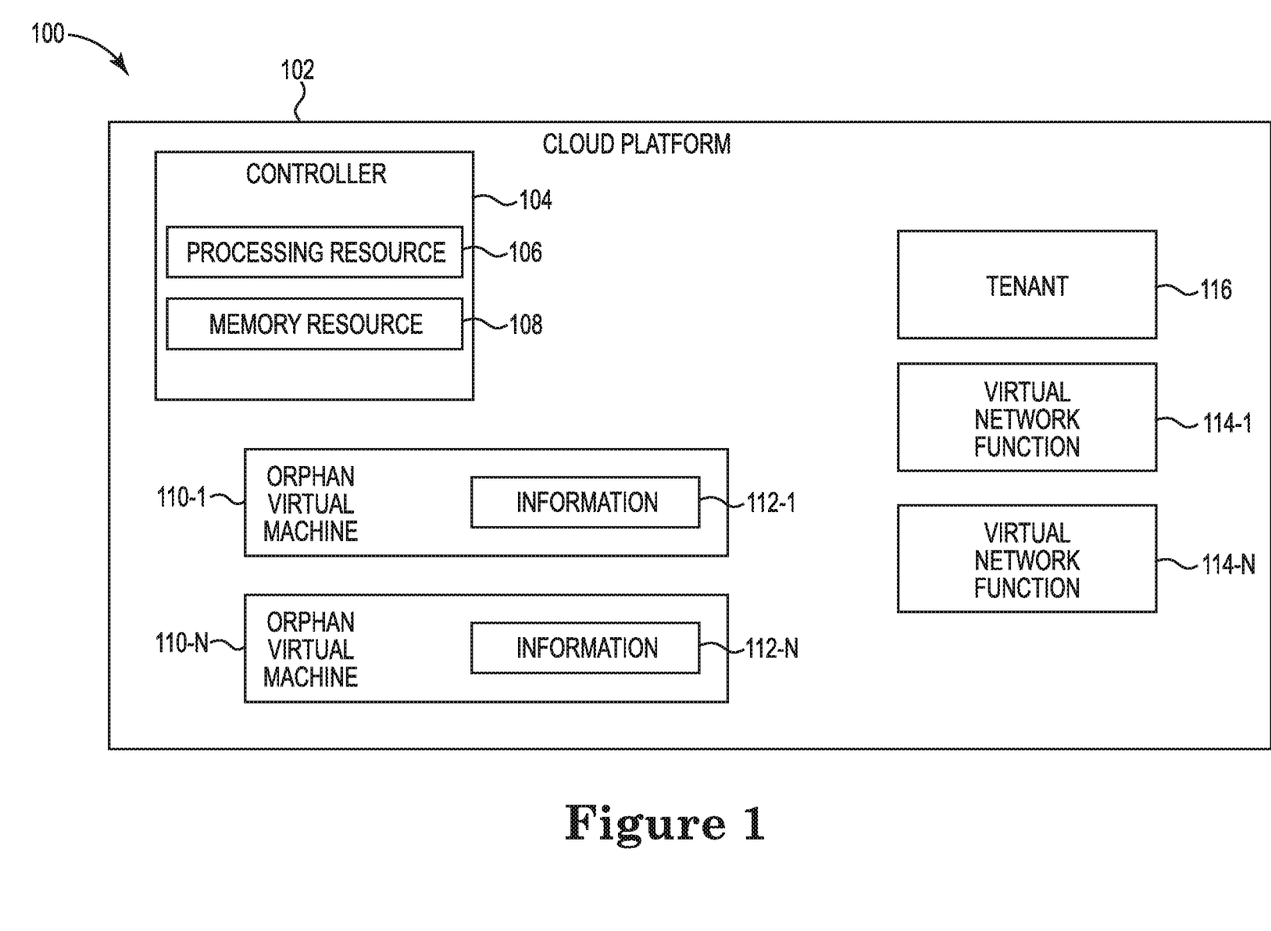
FIG. 1 illustrates an example diagram of an example system including a cloud platform for mapping virtual network functions.

FIG. 1 illustrates an example diagram of an example system 100 including a cloud platform for mapping virtual network functions. FIG. 1 illustrates a cloud platform 102 including a controller 104, a processing resource 106, a memory resource 108, orphan VM 110-1 with information 112-1, orphan VM 110-N with information 112-N, a VNF 114-1, a VNF 114-N, and a tenant 116.

Although the tenant 116 is illustrated in FIG. 1 as existing within the cloud platform 102, the tenant 116 may exist separately and be remote from the cloud platform 102. The orphan VMs 110-1 and 110-N may be a plurality of orphan VMs 110 and may be collectively referred to herein as the orphan VM 110 and/or orphan VMs 110. The orphan VMs 110 may include corresponding information 112-1, and 112-N which may be collectively referred herein as information 112. The VNFs 114-1 and 114-N may be a plurality of VNFs 114 and may be collectively referred to herein as the VNF 114 and/or VNFs 114. As mentioned herein, the cloud platform 102 may be a network that delivers requested virtual resources as a service. For example, the cloud platform 102 may be a public cloud platform, a private cloud platform, and/or a hybrid cloud platform.

As used herein, the term "public cloud platform" can, for example, refer to services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud may be a cloud storage platform which may be developed and sold as a service by a company.

As used herein, the term "private cloud platform" can, for example, refer to a cloud computing environment in which access is exclusively limited to an individual or a business entity. In one example, a private cloud may be a cloud infrastructure operated for a single individual or business entity. In one example, the private cloud is managed internally by the owner of the private cloud infrastructure. In another example, the private cloud is managed by a third-party and hosted internally or externally.

As used herein, the term "hybrid cloud platform" can, for example, refer to a cloud computing environment that comprises a number of public cloud resources and a number of private cloud resources. In one example, a hybrid cloud comprises a cloud network (or a plurality of cloud networks) such as private clouds and public clouds that remain individual networks but are associated to offer a number of services. FIG. 1 illustrates a cloud platform 102 including a controller which may discover orphan VMs 110.

As used herein, the term "controller" can, for example, refer to a computing device that may manage and/or direct the flow of data between other computing devices. Examples of computing devices may include a network device, a client device, an access point, a management entity, and/or a data transfer device. Computing devices may be adapted to transmit and/or receive signaling, and to process information within such signaling across a network. The controller 104 may include a processing resource 106 and a memory resource 108.

For example, the controller 104 may include a processing resource 106. For example, the processing resource 106 may be central processing units (CPUs), semiconductor-based microprocessors, and/or other hardware devices suitable for retrieval and execution of instructions stored in a memory resource 108 (e.g., in a non-transitory computer readable medium). The example processing resource 106 may fetch, decode, and execute instructions. As an alternative, or in addition to, retrieving and executing instructions, the example processing resource 106 may include an electronic circuit (e.g., an application specific integrated circuit (ASIC)) that may include electronic components for performing the functionality of executed instructions.

In some examples, the processing resource 106 may be a plurality of hardware processing units that may cause machine-readable instructions to be executed. The processing resource 106 may include central processing units (CPUs) among other types of processing units. The memory resource 108 may be any type of volatile or non-volatile memory or storage, such as random-access memory (RAM), flash memory, storage volumes, a hard disk, or a combination thereof. The controller 104 may execute instructions to discover an orphan VM included in the cloud platform 102.

As used herein, the term "discover" can, for example, refer to a computing device monitoring, searching, and/or identifying computing resources, VNF(s), VMs, orphan VMs, containers, tenants, programs, policies, etc. For example, the controller 104 may search for and/or identify assets such as programs and other program components hosted on the cloud platform 102 to determine what computing resources are being utilized. The discovery of orphan VMs 110 provides visibility to the controller 104 about what resources are actually consumed on the cloud platform 102 such that the cloud platform may accomplish scale in/scale out functions. For example, without visibility of all of the VMs in the cloud platform 102, an operator may assume that resources are available to deploy new VMs (e.g., scale out) when the resources are actually occupied by the orphan VMs 110. Similarly, an operator may assume that too many resources are being used on the cloud platform 102 and delete VMs (scale in) when resources are actually available. Further, discovery of orphan VMs 110 may allow accurate healing of VNFs 114 because the controller 104 may identify which VNF has malfunctioned.

In some examples, the orphan VMs 110 may be discovered from a VIM inventory. For example, the controller 104 may search for and/or identify the orphan VMs 110 from a VIM inventory (e.g., OPENSTACK) included on the cloud platform 102 to determine what computing resources are being utilized in the cloud platform 102. The VIM inventory may include basic information about the orphan VMs 110 which may be visible on the cloud platform 102.

For example, the controller 104 may determine characteristics of the orphan VM 110-1 based on the corresponding information 112-1 available on the cloud platform 102. As used herein, the term "characteristic" can, for example, refer to an operation attribute of a VM. Examples of a characteristic of an orphan VM 110 may include, a level of security, device behavior, a behavior attribute, compute resources, etc. For example, the orphan VM 110-1 may include information 112-1 "database", thus the characteristic of the orphan VM 110-1 may be a characteristic related to the operation of a database (e.g., a level of security, a capacity, etc.). In another example, the orphan VM 110-1 may include information 112-1 "web application", thus the characteristic of the orphan VM 110-1 may be a characteristic related to the operation of a web server, (e.g., client device communication, compute resources used by a web application, connectivity abilities, etc.). A behavior attribute may also be a characteristic of the orphan VM 110. Some examples of a behavior attribute are static and/or dynamic network attributes that may correspond to the information 112. For example, a behavior attribute may be a Media Access Control (MAC) address, vendor information, Transmission Control (TCP) protocol fingerprinting, Dynamic Host Configuration Protocol (DHCP) fingerprinting, and/or other static/dynamic network behavior attributes from network traffic data.

For example, the controller 104 may identify information 112-1 corresponding to the orphan VM 110-1 which may provide the controller 104 with data relating to the operation of the orphan VM 110-1. As used herein, the term "information" can, for example, refer to data that may be visible on the cloud platform 102 about the orphan VMs 110. Some examples of the information 112 that may be visible to the controller 104 about the corresponding orphan VMs 110 are a type of computing resource (e.g., a database, an application, a web application, etc.) which may provide evidence of the characteristic associated with the orphan VM 110.

For example, the information 112-1 corresponding to the orphan VM 110-1 may be "Webserver 1". The information 112 "Webserver 1" may provide the controller 104 with data relating to how the orphan VM 110-1 may operate and/or the computing resources that may be utilized by the orphan VM 110-1 (e.g., the characteristics of orphan VM 110-1). Specifically, the controller 104 may determine that the resources used by the orphan VM 110-1 may be related to resources used by a webserver. In this way, the controller 104 may avoid deploying additional VMs which may utilize computing resources that may already be utilized by the orphan VMs 110-1. In other words, the identification of information 112 may provide data to the controller 104 about the resource consumption of the cloud platform 102. Further, the identification of information 112 about the orphan VMs 110 may avoid unauthorized cost when the orphan VMs are executed in an external cloud (e.g., a public cloud). In some examples, based on the information 112 identified, the controller 104 may map the orphan VMs 110 to a VNF 114.

As used herein, the term "map" and/or "mapping" can, for example, refer to assigning a VM to a VNF to identify and manage the operation of the VM. For example, the controller 104 may map the orphan VM 110-1 to a VNF 114-1 based on the information 112-1 identified in the cloud platform 102. For example, the information 112-1 identified on the cloud platform 102 may include a container used by the orphan VM 110. In other words, the controller 104 may map the orphan VM 110-1 to a VNF 114-1 in a one-to-one manner based on the container (e.g., the objects stored on the orphan VM 110-1). The controller 104 may map the orphan VM 110-1 to the VNF 114-1 and apply a corresponding descriptor to the VNF 114-1 based on a policy of the controller 104. In some examples, the descriptor may be generic such that it may be sufficient to account for the orphan VMs 110 and provide some information that may be useful for the controller 104 to apply policies.

As used herein, the term "policy" and/or "policies" can, for example, refer to conditions, constraints, and/or settings that designate who/what is authorized to connect to the network and the circumstances under which they can or cannot connect. Policies may be complex, such as ensuring that unauthorized users are prevented from accessing sensitive servers or malicious traffic is eliminated from the network (e.g., the cloud platform 102). In some examples discussed further in connection with FIG. 2, an entity (e.g., a user, operator, administrator, computer program, etc.) may control a user interface where orphan VM(s) 110 may be grouped to an individual VNF 114 with a detailed VNF descriptor.

The controller 104 may map the orphan VM 110-1 to a VNF 114-1 based on the information 112-1 identified in the cloud platform 102. For example, the information 112-1 identified on the cloud platform 102 may include a network resource used by the orphan VM 110. In other words, the controller 104 may map the orphan VM 110-1 to a VNF 114-1 in a one-to-one manner based on the network resource (e.g., CPU information, etc.) utilized by the orphan VM 110-1. In another example, the controller 104 may map the orphan VM 110-1 to a VNF 114-1 based on other information 112-1 identified in the cloud platform 102. For example, the information 112-1 identified on the cloud platform 102 may include a storage resource used by the orphan VM 110. In other words, the controller 104 may map the orphan VM 110-1 to a VNF 114-1 in a one-to-one manner based on the storage resource (e.g., external volumes where the orphan VM may store data) utilized by the orphan VM 110-1. The one-to-one mapping of the discovered orphan VMs 110 may allow the controller 104 to identify the orphan VMs 110 and map them to a VNF 114 on the cloud platform 102. In this way, the controller 104 may identify characteristics of the orphan VMs 110 such that the VNFs 114 may be assigned to a tenant 116.

As used herein, the term "tenant" can, for example, refer to a user and/or a group of users (e.g., computing devices) that have access and/or privileges to a computing instance (e.g., a VM). For example, the controller 104 may include policies that define which resources (e.g., privileges) a tenant 116 may access. In some examples, the cloud platform 102 may include a catalog including the policies and tenants 116 of the cloud platform 102 such that the catalog may be used to map the orphan VM 110 to the VNF 114 and the tenant 116. For example, the controller 104 may utilize the catalog to assign the VNF 114 to a tenant 116 based on the characteristics of the orphan VM 110 determined by the controller 104. For example, the controller 104 may determine that the characteristics of the orphan VM 110-1 indicate that the orphan VM 110-1 may be a database, and the policies of the controller 104 may define that the tenant 116 may access the orphan VM 110-1. Thus, the controller 104 may map the orphan VM 110-1 to the VNF 114-1 and assign the VNF 114-1 to the tenant 116. Although, FIG. 1 illustrates an individual tenant 116 the cloud platform 102 may include multiple or no tenants 116. In some examples, the controller 104 may remove (e.g., delete) the orphan VM 110 from the cloud platform 102.

For example, the controller 104 may remove an orphan VM 110 based on a resource utilized by the orphan VM 110 and on a policy of the controller 104. In other words, the controller 104 may include policies that may restrict particular resources (e.g., a particular database). For example, the controller 104 may determine that the information 112-1 of the orphan VM 110-1 utilizes a particular database that is restricted by the policies of the controller 104. Thus, the controller 104 may remove the orphan VM 110-1 from the cloud platform 102 based on the policy of the controller 104. In other examples, the controller 104 may remove (e.g., delete) the VNF 114-1 which may include the orphan VM 110-1, where deleting the VNF 114-1 deletes the orphan VM 110-1. In some examples, the controller 104 may utilize the one-to-one mapping to discover new orphan VMs 110.

For example, the controller 104 may discover a new orphan VM 110-N on the cloud platform 102. In some examples, an orphan VM 110 may be manually created after the adoption of an NFV platform and may be not be managed by the controller 104. A new orphan VM 110 may be created in an urgent instance, during a service outage, and/or during other events where an operator may not utilize the NFV platform. In this instance, the controller 104 may generate an alert (e.g., an e-mail etc.) to notify the tenant 116 of the discovery of the new orphan VM 110 on the cloud platform. For example, the controller 104 may generate an e-mail alert to the tenant 116 in response to the discovery of a new orphan VM 110, the tenant 116 may remove the new orphan VM 110 from the cloud platform. In this way, the tenant 116 may avoid an unauthorized use. In another example, the alert may be generated to maintain visibility of the devices utilizing resources on the cloud platform 102. For example, the controller 104 may generate an alert to the tenant 116 such that the tenant 116 may be aware of resources being utilized by the new orphan VM 110. In response to receiving the alert and gaining visibility of the devices on the cloud platform 102, the tenant 116 may remove (delete) the new orphan VM 110 and/or add more orphan VMs 110 to the cloud platform 102.

The examples described in connection with FIG. 1 describe mapping virtual network functions in a one-to-one manner where orphan VMs 110 are discovered on the cloud platform 102 and mapped to VNFs 114 based on characteristics of the orphan VMs 110. In this way, the controller 104 may identify VMs that were manually created prior to NFV adoption. This may alert the controller 104 to unauthorized use of the cloud platform 102, send alerts when new orphan VMs 110 appear on the cloud platform 102, and/or identify when computing resources are occupied by the orphan VMs 110. Mapping the orphan VMs 110 to a VNF 114 may provide visibility to the controller 104 and a solution to the management of orphan VMs 110. Thus, alleviating the dependence on knowledge of the entities that manually created the orphan VMs 110.

Figure 2:
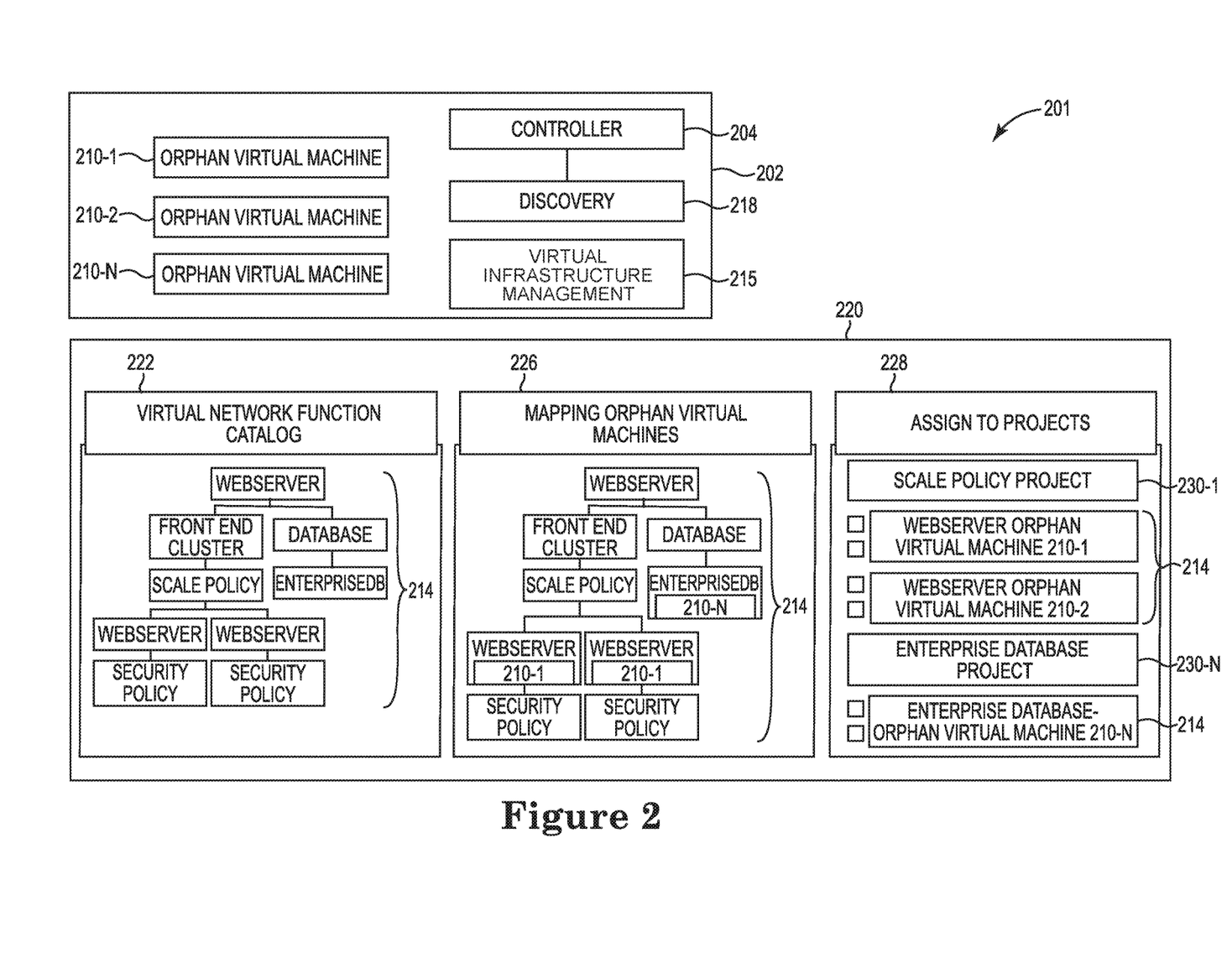
FIG. 2 illustrates an example schematic diagram for mapping virtual network functions consistent with the disclosure.

FIG. 2 illustrates an example schematic diagram 201 for mapping virtual network functions consistent with the disclosure. FIG. 2 illustrates a cloud platform 202, a controller 204 to discover orphan VMs 210-1, 210-2, 210-N, a virtual infrastructure management (VIM) 215, and a user interface 220. As illustrated in FIG. 2, the user interface 220 may include a first screen 222, a second screen 226, and a third screen 228. Although not shown in FIG. 2, as to not obscure the examples of the disclosure, the controller 204 may include a processing resource and a memory resource similar to the processing resource 106 and the memory resource 108 as referenced in FIG. 1. Likewise, the orphan VMs 210 may include information similar to the information 112 of FIG. 1. The operations are not limited to a particular example described herein and may include additional operations such as those described with regard to the system 100, described in connection with FIG. 1. The user interface 220 may be a visual display on a computing system.

For example, a computing system may include a processing resource or a plurality of processing resources to execute instruction such as instruction corresponding to an operating system (e.g., Linus, Unix, Windows, etc.) to provide common services for applications running on the computing system. Some examples, of devices that include computing systems are personal computers, laptops, tablets, phablets, smartphones, Internet-of-Things (IoT) enabled devices, etc., may be included on a virtualized architecture and/or a non-virtualized architecture. As used herein, "IoT enabled devices" can, for example, include devices embedded with electronics, software, sensors, actuators, and/or network connectivity which enable such devices to connect to a network and/or exchange data. Examples of IoT enabled devices include vehicles, home appliances, smart home devices, monitoring devices, wearable devices, devices enabling intelligent shopping systems, manufacturing devices, among other cyber-physical systems. The user interface 220 may provide an interface for an entity (e.g., a user, an administrator, or a controller, etc.) to assign a specific descriptor to VNFs.

The user interface 220 may include functionality to select, deselect, import, export, information and/or data. The user interface 220 may include functionality to select objects via touch screen, mouse, drag and drop, audio command, and/or automatic techniques (e.g., machine learning). The user interface 220 may be included on a computing systems such that information from the cloud platform 202 may be displayed on the user interface 220. For example, the discovery (at 218) of the orphan VMs 210 may be displayed on the user interface 220 such that a user may select, deselect, delete, remove, organize, or otherwise manipulate the orphan VMs 210. The user interface 220 may provide a visual medium such as the screens 222, 226, and 228, to initiate a discovery (at 218) of the orphan VMs or perform scale in and scale out operations. In some examples, the orphan VMs may include metadata which may be discovered at 218. For example, the discovery of the orphan VMs 210 may include metadata from the orphan VMs 210 which may be displayed on the user interface 220. The metadata of the orphan VMs 210 is discussed further herein in conjunction with FIG. 3.

As illustrated in FIG. 2, the user interface 220 includes an example of a first screen 222. The first screen 222 displays a virtual network function (VNF) catalog including multiple VNFs 214. In some examples, the VNF catalog of the first screen 222 may include the VNFs 214 as determined from the cloud platform 202. As illustrated in FIG. 2, the VNFs 214 include descriptors. The descriptors illustrated are by way of example and may include other VNF descriptors than those illustrated. In some examples, the VNF catalog may be displayed on the first screen 222 from the VIM 215 of the cloud platform 202.

The VIM 215 of the cloud platform 202 may indicate that multiple VMs are assigned to a VNF 214. In this example, an entity may interact with the first screen 222 to determine which of the discovered orphan VMs 210 may be grouped together based on the characteristics of the orphan VMs 210. In a specific example, the controller 204 may discover at 218 the orphan VMs 210-1, 210-2, and 210-N and determine the characteristics of the orphan VMs 210. A user may interact with the first screen and determine that the VNF catalog on the first screen 222 indicates that the VNFs 214 include three VMs. The orphan VMs 210 may be selected (e.g., via a user) and inputted them to the appropriate VNF 214.

For example, the second screen 226 illustrates an example of mapping the orphan VMs 210 to VNFs 214. In a specific example, the controller 204 may determine characteristics about the orphan VMS 210 based on information included in the orphan VMs 210. The determined characteristics may be used to associate the VNFs 214 with the orphan VMs 210. In this example, assume that the orphan VMs 210-1 and 210-2 include information relating to a webserver and orphan 210-N includes information relating to a database. In this instance, the orphan VMs 210 may be selected and mapped to the VNFs 214 labeled as webservers and Enterprise database (e.g., by a user via drag and drop, etc.). In this way, the orphan VMs 210 may be grouped, and specific descriptors may be applied to the VNFs 214. The specific descriptors of the VNFs 214 may provide visibility to the controller 204 as well as users and/or administrators. Further, the organization of the VNFs 214 to include specific descriptors allows for projects, tenants (e.g., the tenant 116), and policies to be applied to the VNFs 214.

For example, the third screen 228 illustrates an example of assigning VNFs 214 to projects. In this example, a specifically labeled VNF 214 may be selected (e.g., via a user, etc.) from the second screen 226 and assign it to a project. The scale policy project 230-1 is an example of a project where two VNFs 214 have been assigned and specifically labeled "webserver—orphan virtual machine" 210-1 and "webserver—orphan virtual machine" 210-2. The enterprise database project 230-N has been assigned the VNF 214 specifically labeled as "Enterprise database—orphan virtual machine" 210-N. While the examples associated with FIG. 2 discuss three screens, examples are contemplated to include more or less than three screens. Further, multiple screens may include other functionality such as applying policies from the controller 204 and/or assigning VNFs 214 to tenants.

The examples described in connection with FIG. 2 describe mapping virtual network functions by grouping the orphan VMs 210 and providing specific descriptors to the VNFs 214. In this way, the controller 104 may identify VMs that were manually created prior to NFV adoption and organize them on the cloud platform 202. The VNFs 214 may be assigned to projects, policies, and scale in and scale out operations may be performed utilizing an example user interface 220. Mapping the orphan VMs 210 to a VNF 114 may provide visibility to the controller 204 and an entity (e.g., a user/operator) and a solution to the management of orphan VMs 210. Thus, alleviating the dependence on knowledge of the entities that manually created the orphan VMs 210.

Figure 3:
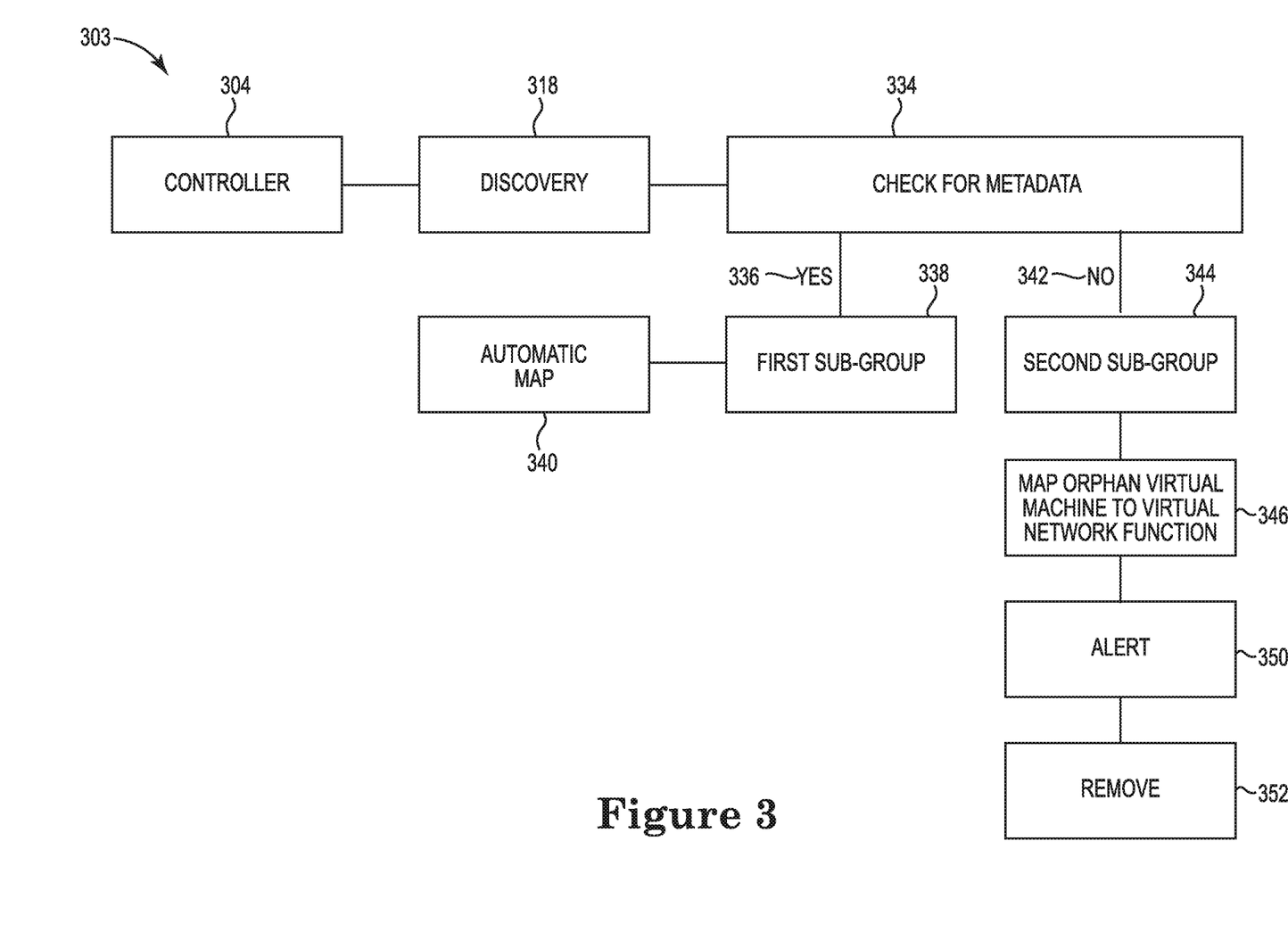
FIG. 3 illustrates an example diagram for mapping virtual network functions consistent with the disclosure.

FIG. 3 illustrates an example diagram 303 for mapping virtual network functions consistent with the disclosure. FIG. 3 includes a controller 304 to discover at 318 orphan VMs (e.g., the orphan VMs 110 of FIG. 1). Although not shown in FIG. 3, as to not obscure the examples of the disclosure, the controller 304 may include a processing resource and a memory resource similar to the processing resource 106 and the memory resource 108 of FIG. 1. The operations are not limited to a particular example described herein and may include additional operations such as those described with regard to the system 100, and the schematic diagram 201, described in connection with FIGS. 1, and 2. In some examples, the orphan VMs may include metadata.

As used herein, the term "metadata" can, for example, refer to data that a cloud service provider may provide to a VM. For example, a cloud service providers may include metadata such as the ID of the VNF (e.g., the VNF 114 of FIG. 1) to which the VM is mapped, and/or the computing component ID of the VM. At block 318, the controller 304 may execute a discovery for orphan VMs. In some examples as described in connection with FIGS. 1 and 2, the discovery at 318 may include determining information (e.g., the information 112 of FIG. 1) of the orphan VMs and mapping the orphan VMs to VNFs based on the characteristics determined form the information of the orphan VMs. In other examples, the controller 304 may check the orphan VMs for metadata.

For example, the controller 304 may, at block 334, check the discovered orphan VMs for metadata. In some examples, the metadata may have been applied to the orphan VMs at the time they were manually created (prior to the adoption of NFV). In other examples, the discovery at 318 by the controller 304 may identify new orphan VMs that were manually created (e.g., after the adoption of NFV), thus the cloud service provider hosting the cloud platform (e.g., the cloud platform 102) may have applied the metadata to the new orphan VMs. Periodically executing a discovery may identify new orphan VMs such that the controller 304 may operate and execute functions (e.g., scale in, scale out, and/or healing) accurately and efficiently. In some examples, the controller 304 may determine whether the orphan VM includes metadata.

For example, the controller 304 may determine that the discovered orphan VMs include metadata ("YES" at 336) by checking the orphan VM at block 334. In this instance, the controller 304 may identify the orphan VMs which include metadata as a first sub-group at block 338. The metadata of the orphan VMs of the first sub-group may be identified using a computing system and presented on a user interface (e.g., the user interface 220). For example, at block 340, the controller 304 may automatically map the orphan VMs of the first sub-group to a specific VNF when the orphan VMs include metadata where the specific VNF is determined based on the metadata. In other words, the identified metadata from the first sub-group may be presented on a user interface of a computing system, and a user may operate the user interface to map each orphan VM from the first sub-group to a specific descriptor of the VNF based on the metadata of each orphan VM. In this instance, the specific descriptor of the VNF may be displayed from a VIM (e.g., the VIM 215 of FIG. 2) inventory. In some examples, the controller 304 may determine that the discovered orphan VMs do not include metadata.

For example, the controller 304 may determine that the discovered orphan VMs do not include metadata ("NO" at 342) by checking the orphan VM at block 334. In this instance, the controller 304 may identify the orphan VMs which are absent metadata as a second sub-group at block 344. In some examples, the absence of metadata by the second sub-group may indicate that the orphan VMs were manually created prior to the adoption of NFV. The orphan VMs of the second sub-group may be mapped to a VNF at block 346 by the controller 304 by identifying characteristics based on the information (e.g., the information 112) included in the orphan VMs. In some examples, the absence of metadata of the second sub-group may indicate that the orphan VMs of the second sub-group are unauthorized to be included on the cloud platform.

The absence of metadata from the second sub-group may indicate that the orphan VMs include unauthorized use and may be removed from the cloud platform. For example, at block 350, the controller 304 may generate an alert about the second sub-group to an administrator (e.g., a network function virtualization orchestrator (NVFO), a tenant, etc.). The alert may be in the form of an electronic communication (e.g., an e-mail, an instant message, a SMS, etc.). In response to the controller 304 having generated the alert, the controller 304, at block 352 may remove the second subgroup from the cloud platform as the unauthorized use may be in violation of policies implemented by the controller 304. In other words, the controller 304 may, at block 352, delete the second sub-group of orphan VMs from the cloud platform based on the absence of metadata and criteria defined in a policy of the controller 304.

The examples described in connection with FIG. 3 describe mapping virtual network functions by grouping the orphan VMs into sub-groups where one sub-group of orphan VMs includes metadata and the other does not. The metadata information may be included on the user interface as described in connection with FIG. 2. By checking for metadata, orphan VMs that have appeared from manual intervention may be identified and automatically mapped to a VNF within the cloud platform. The detection of orphan VMs absent metadata may generate alerts which may remove the orphan VM.

Figure 4:
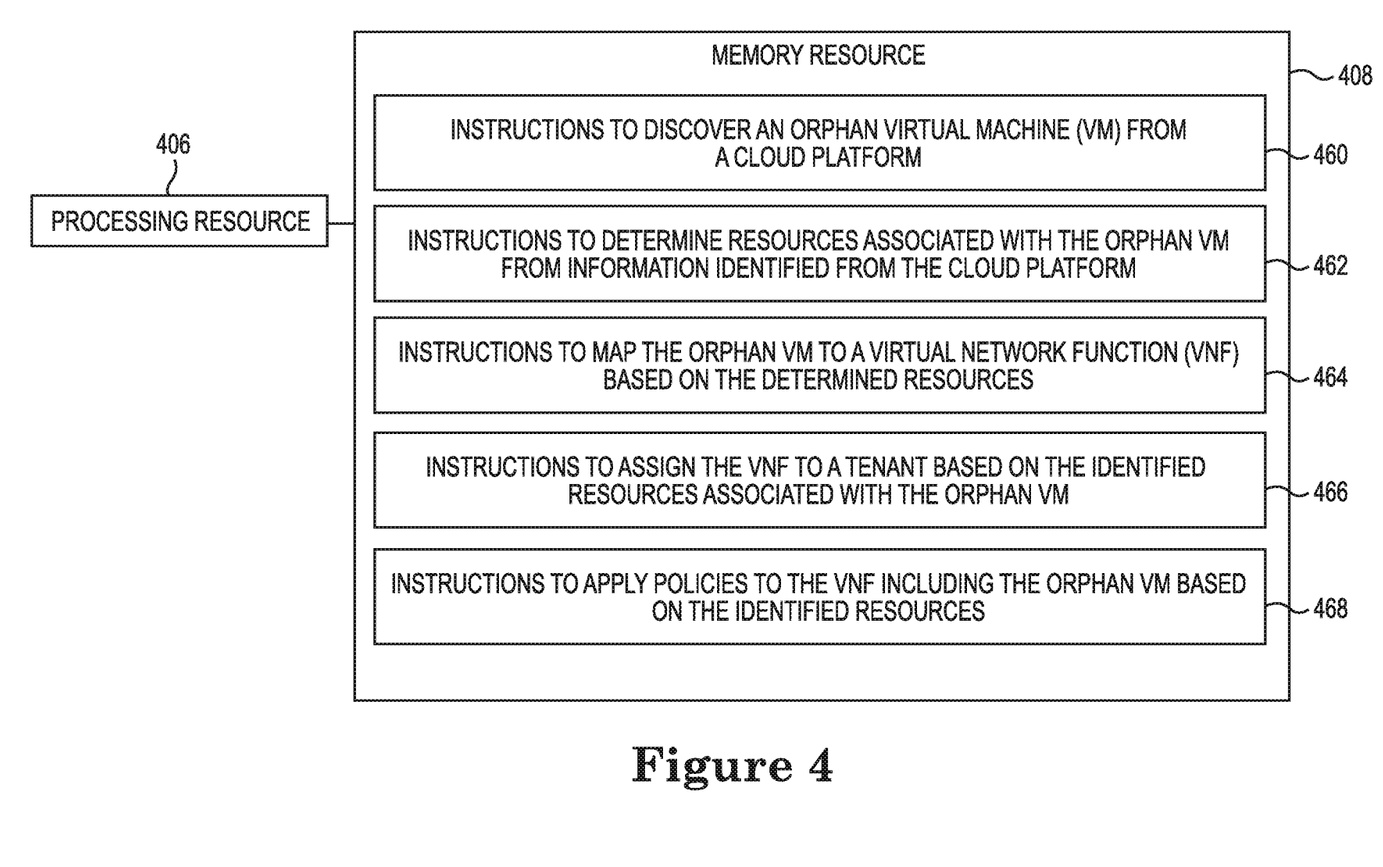
FIG. 4 illustrates an example of a non-transitory machine-readable memory resource and processing resource for mapping virtual network functions consistent with the disclosure.

FIG. 4 illustrates an example of a non-transitory machine-readable memory resource and processing resource for mapping virtual network functions consistent with the disclosure. The processing resource 406, and the non-transitory memory resource 408, illustrated in FIG. 4 may be analogous to the elements illustrated in FIGS. 1, 2, and 3. A memory resource, such as the non-transitory memory resource 408, may be used to store instructions (e.g., 460, 462, 464, 466, and 468) executed by the processing resource 406 to perform the operations as described herein. The operations are not limited to a particular example described herein and may include additional operations such as those described with regard to the system 100, the schematic diagram 201, and the diagram 303 described in connection with FIGS. 1, 2, and 3.

The non-transitory memory resource 408 may store instructions 460 executable by the processing resource 406 to discover an orphan VM (e.g., the orphan VMs 110) from a cloud platform (e.g., the cloud platform 102). For example, a controller (e.g., the controller 104) may search for and/or identify orphan VMs and determine resources such as programs and other program components hosted on the cloud platform are being utilized. The controller may determine resources associated with the VM by information (e.g., the information 112) included on the orphan VM.

For example, the non-transitory memory resource 408 may store instructions 462 executable by the processing resource 406 to determine resources associated with the orphan VM from information identified from the cloud platform. The resources associated with the orphan VM may be computing resources used by the orphan VM. For example, the controller may determine characteristics of the orphan VM based on the corresponding information available on the cloud platform. Some examples of the information that may be visible to the controller about the corresponding orphan VMs are a type of computing resource (e.g., a database, an application, a web application, etc.) which may provide evidence of the characteristic associated with the orphan VM. the controller may use the information included on the orphan VM to map the orphan VM to a VNF.

For example, the non-transitory memory resource 408 may store instructions 464 executable by the processing resource 406 to map the orphan VM to a VNF (e.g., the VNF 114) based on the determined resources. For example, the controller may map the orphan VM to a VNF based on the information identified in the cloud platform. In this example, the orphan VM may be mapped to a VNF based on the resource identified. In some examples, VNF may be assigned a tenant based on the identified resources.

For example, the non-transitory memory resource 408 may store instructions 466 executable by the processing resource 406 to assign the VNF to a tenant (e.g., the tenant 116) based on the identified resources associated with the orphan VM. For example, the controller may include policies that define which resources (e.g., privileges) the tenant may access. Thus, based on the resources identified, the orphan VM may be assigned a tenant. In some examples, the controller may apply policies to the VNF.

For example, the non-transitory memory resource 408 may store instructions 468 executable by the processing resource 406 to apply policies to the VNF including the orphan VM based on the identified resources. in some examples, the policies may be complex, such as ensuring that unauthorized users are prevented from accessing sensitive servers or malicious traffic is eliminated from the network (e.g., the cloud platform 102). For example, the policies applied to the VNF include affinity policies for other resources within the cloud platform.

Figure 5:
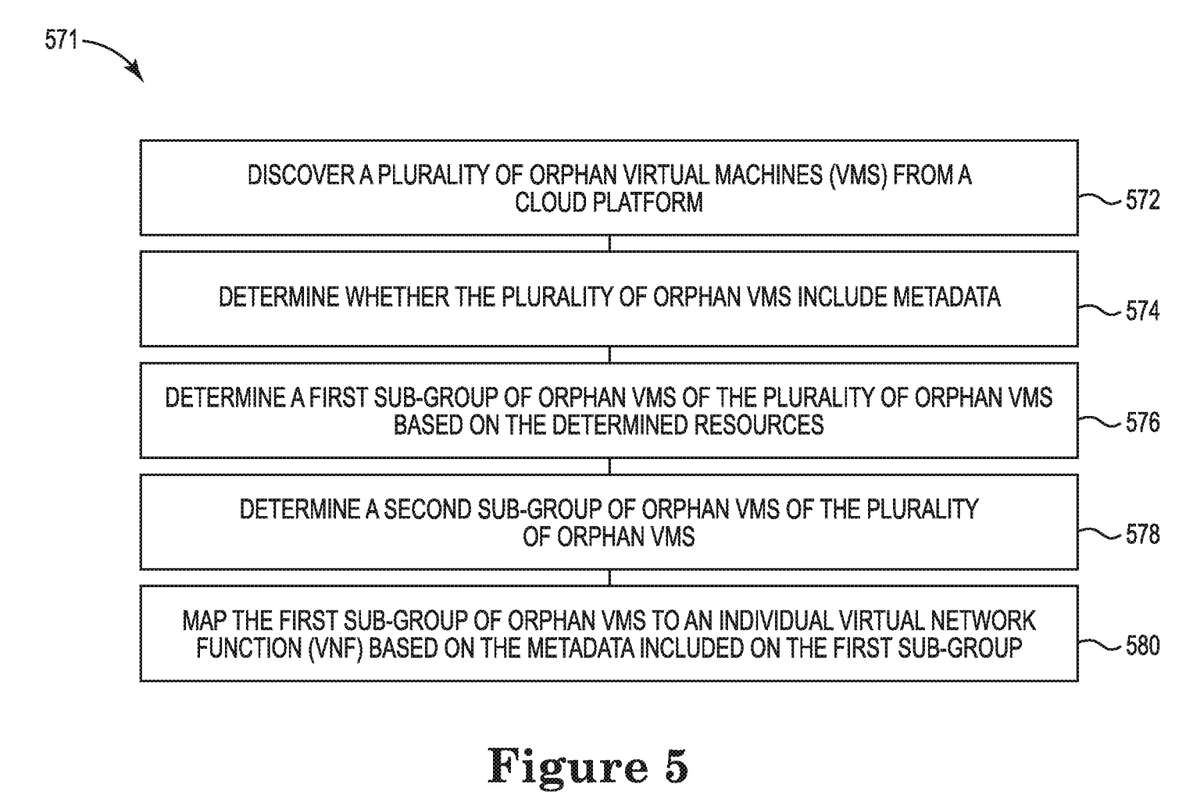
FIG. 5 illustrates an example of a method for mapping virtual network functions consistent with the disclosure.

FIG. 5 illustrates an example of a method 571 for mapping virtual network functions consistent with the disclosure. At 572, discovering, by a controller (e.g., the controller 104) a plurality of orphan virtual machines (VMs) (e.g., the orphan VMs 110) from a cloud platform (e.g., the cloud platform 102). For example, a controller may search for and/or identify orphan VMs and determine resources such as programs and other program components hosted on the cloud platform are being utilized. The operations are not limited to a particular example described herein and may include additional operations such as those described with regard to the system 100, the schematic diagram 201, the diagram 303, and the example processing resource 406 and memory resource 408, described in connection with FIGS. 1, 2, 3, and 4. In some examples, the controller may determine whether the plurality of orphan VMs include metadata.

For example, at block 574, determining, by the controller, whether the plurality of orphan VMs include metadata. For example, the controller may, check the discovered plurality of orphan VMs for metadata. In some examples, the metadata may have been applied to the orphan VMs at the time they were manually created (prior to the adoption of NFV). In other examples, the discovery at by the controller 304 may identify new orphan VMs that were manually created, thus the cloud service provider hosting the cloud platform may have applied the metadata to the new orphan VMs. In some examples, the controller may determine that a portion of the plurality of VMs includes metadata.

For example, at block 576, determining, by the controller, a first sub-group of orphan VMs of the plurality of orphan VMs, wherein the first sub-group includes metadata. The metadata of the orphan VMs of the first sub-group may be identified using a computing system and presented on a user interface (e.g., the user interface 220). For example, the controller may automatically map the orphan VMs of the first sub-group to a specific VNF when the orphan VMs include metadata where the specific VNF is determined based on the metadata. In other words, the identified metadata from the first sub-group may be presented on a user interface of a computing system, and a user may use the user interface to map each orphan VM from the first sub-group to a specific descriptor of the VNF based on the metadata of each orphan VM. In this instance, the specific descriptor may be displayed from a VIM (e.g., the VIM 215 of FIG. 2) inventory. In some examples, the controller may determine that a portion of the discovered orphan VMs do not include metadata.

For example, at block 578, determining, by the controller, a second sub-group of orphan VMs of the plurality of orphan VMs, wherein the second sub-group is absent metadata. In some examples, the absence of metadata by the second sub-group may indicate that the orphan VMs were manually created prior to the adoption of NFV. The orphan VMs of the second sub-group may be mapped to a VNF by the controller identifying characteristics based on the information included in the orphan VMs. In some examples, the absence of metadata of the second sub-group may indicate that the orphan VMs of the second sub-group are unauthorized to be included on the cloud platform. The presence of metadata may automatically map the first sub-group to a VNF.

For example, at block 580, mapping, by the controller, the first sub-group of orphan VMs to an individual virtual network function (VNF) based on the metadata included on the first sub-group. For example, the controller may automatically map the orphan VMs of the first sub-group to a specific VNF when the orphan VMs include metadata where the specific VNF is determined based on the metadata.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system, comprising:
   a controller comprising:
      a processing resource; and
      a memory resource including instructions that when executed cause the processing resource to:
   initiate a discovery process to discover an orphan virtual machine (VM) included in a cloud platform, wherein the orphan VM is not visible to the controller prior to initiating the discovery process, wherein the orphan VM is not visible to the controller as a result of the orphan VM having been manually deployed within the cloud platform, and wherein the discovery process determines characteristics of the orphan VM based on information identified in the cloud platform, wherein the discovery process comprises:
      accessing a virtual infrastructure management (VIM) inventory; and
      comparing, by the controller, computing resources identified in the VIM inventory with known resources;
   map the orphan VM to a virtual network function (VNF) based on the information identified in the cloud platform; and
   assign the VNF to a tenant based on the characteristics of the orphan VM.

2. The system of claim 1, wherein the information identified on the cloud platform includes a container used by the orphan VM.

3. The system of claim 1, wherein the orphan VM is discovered from the virtual infrastructure management (VIM) inventory.

4. The system of claim 1, wherein the controller maps the orphan VM to the VNF and a corresponding descriptor of the VNF based on a policy of the controller.

5. The system of claim 1, wherein the information identified on the cloud platform includes network resources used by the orphan VM.

6. The system of claim 1, wherein the information identified on the cloud platform includes storage resources used by the orphan VM.

7. The system of claim 1, the controller to:
   discover a new orphan VM on the cloud platform, wherein the new orphan VM is not currently controlled by the controller as a result of the new orphan VM having been manually deployed within the cloud platform; and
   generate an alert to notify the tenant of the discovery of the new orphan VM on the cloud platform.

8. The system of claim 1, wherein the controller removes the orphan VM based on a resource utilized by the orphan VM and on a policy of the controller.

9. A non-transitory machine-readable storage medium storing instructions that, when executed by a processing resource, cause the processing resource to:
   initiate a discovery process to discover an orphan virtual machine (VM) from a cloud platform, wherein the orphan VM is not visible to the controller prior to initiating the discovery process, wherein the orphan VM is not visible to the controller as a result of the orphan VM having been manually deployed within the cloud platform, and wherein the discovery process determines resources associated with the orphan VM from information identified from the cloud platform, wherein the discovery process comprises:
      accessing a virtual infrastructure management (VIM) inventory; and
      comparing, by the controller, computing resources identified in the VIM inventory with known resources;
   map the orphan VM to a virtual network function (VNF) based on the determined resources;
   assign the VNF to a tenant based on the identified resources associated with the orphan VM; and
   apply policies to the VNF including the orphan VM based on the identified resources.

10. The medium of claim 9, wherein the resources associated with the orphan VM are computing resources used by the orphan VM.

11. The medium of claim 9, wherein the policies applied to the VNF include affinity policies for other resources within the cloud platform.

12. The medium of claim 9, wherein the cloud platform includes a catalog comprising the policies and tenants of the cloud platform such that the template is used to map the orphan VM to the VNF.

13. The medium of claim 12, wherein the VNF is assigned a specific descriptor identified from the catalog.

14. The medium of claim 9, further including instructions that when executed by the processing resource cause the processing resource to:
   determine whether the orphan VM includes metadata; and
   automatically mapping the orphan VM to a specific VNF when the orphan VM includes metadata, wherein the specific VNF is determined based on the metadata.

15. The medium of claim 9, further including instructions that when executed by the processing resource cause the processing resource to:
   determine whether the orphan VM includes metadata; and
   generate an alert to the tenant about the orphan VM when the orphan VM is absent metadata.

16. A method comprising:
   initiating a discovery process to discover a plurality of orphan virtual machines (VMs) from a cloud platform, wherein the plurality of orphan VMs are not visible to the controller prior to initiating the discovery process, wherein the orphan VM is not visible to the controller as a result of the plurality of orphan VMs having been manually deployed within the cloud platform, and wherein the discovery process determines whether the plurality of orphan VMs include metadata, wherein the discovery process comprises:
      accessing a virtual infrastructure management (VIM) inventory; and
      comparing, by the controller, computing resources identified in the VIM inventory with known resources;
   determining a first sub-group of orphan VMs of the plurality of orphan VMs, wherein the first sub-group includes metadata;
   determining a second sub-group of orphan VMs of the plurality of orphan VMs, wherein the second sub-group is absent metadata; and
   mapping the first sub-group of orphan VMs to an individual virtual network function (VNF) based on the metadata included on the first sub-group.

17. The method of claim 16, further comprising:
   generating an alert about the second sub-group to a network function virtualization orchestrator (NFVO).

18. The method of claim 16, further comprising:
   deleting the second sub-group of orphan VMs from the cloud platform based on the absence of metadata and criteria defined in a policy of a controller.

19. The method of claim 16, wherein the absence of metadata of the second sub-group indicates that the orphan VMs of the second sub-group are unauthorized to be included on the cloud platform.

20. The method of claim 16, further comprising:
   identifying the metadata from the first sub-group; and
   mapping each orphan VM from the first sub-group to a specific descriptor of the VNF based on the metadata of each orphan VM of the first sub-group, wherein the specific descriptor is included in the virtual infrastructure management (VIM) inventory.

21. The system of claim 1, wherein the information identified in the cloud platform is a resource consumption of the orphan VM that identifies an existence of the orphan VM.

22. The system of claim 1, wherein the known resources include computing resources visible to the controller in the cloud platform.

23. The system of claim 1, wherein the orphan VM is manually deployed prior to implementation of Network Function Virtualization (NFV) in the cloud platform.

24. The system of claim 23, wherein the orphan VM is in operation at a time it is not visible to the controller.

* * * * *